United States Patent

Chou et al.

[11] Patent Number: 5,509,756
[45] Date of Patent: Apr. 23, 1996

[54] OIL BOOM END CONNECTOR

[75] Inventors: Chun C. Chou; Joe Falk; Robert Ferguson; Glenn Beach, all of Columbia, Md.

[73] Assignee: TCOM, L.P., Columbia, Md.

[21] Appl. No.: 205,732

[22] Filed: Mar. 4, 1994

[51] Int. Cl.$^6$ ................................................ E02B 15/04
[52] U.S. Cl. ........................... 405/70; 405/72; 403/335
[58] Field of Search .......................... 405/70, 71, 72; 403/335, 355, 356

[56] References Cited

U.S. PATENT DOCUMENTS

| | | |
|---|---|---|
| 2,581,793 | 1/1952 | Hill . |
| 3,848,417 | 11/1974 | Smith et al. . |
| 4,155,664 | 5/1979 | Acheson ............................ 405/70 X |
| 4,239,280 | 12/1980 | Ackerman . |
| 4,295,756 | 10/1981 | Blair . |
| 4,367,979 | 1/1983 | Milligan ............................ 405/70 |

*Primary Examiner*—Ramon S. Britts
*Assistant Examiner*—Fredrick L. Laeman

[57] ABSTRACT

An end connector for use with oil containment booms, wherein the connector design utilizes a stress distribution technique which avoids the need for proximal end flanges, internal cavity traction surfaces, and further avoids bolts, rivets, or other fasteners through the boom fin end. The end connector design has a smaller size than conventional end connector designs with comparable tensile strength capabilities. Further, the end connector may be fabricated faster than conventional end connectors, reduces connector cost, and reduces final boom assembly time.

20 Claims, 8 Drawing Sheets

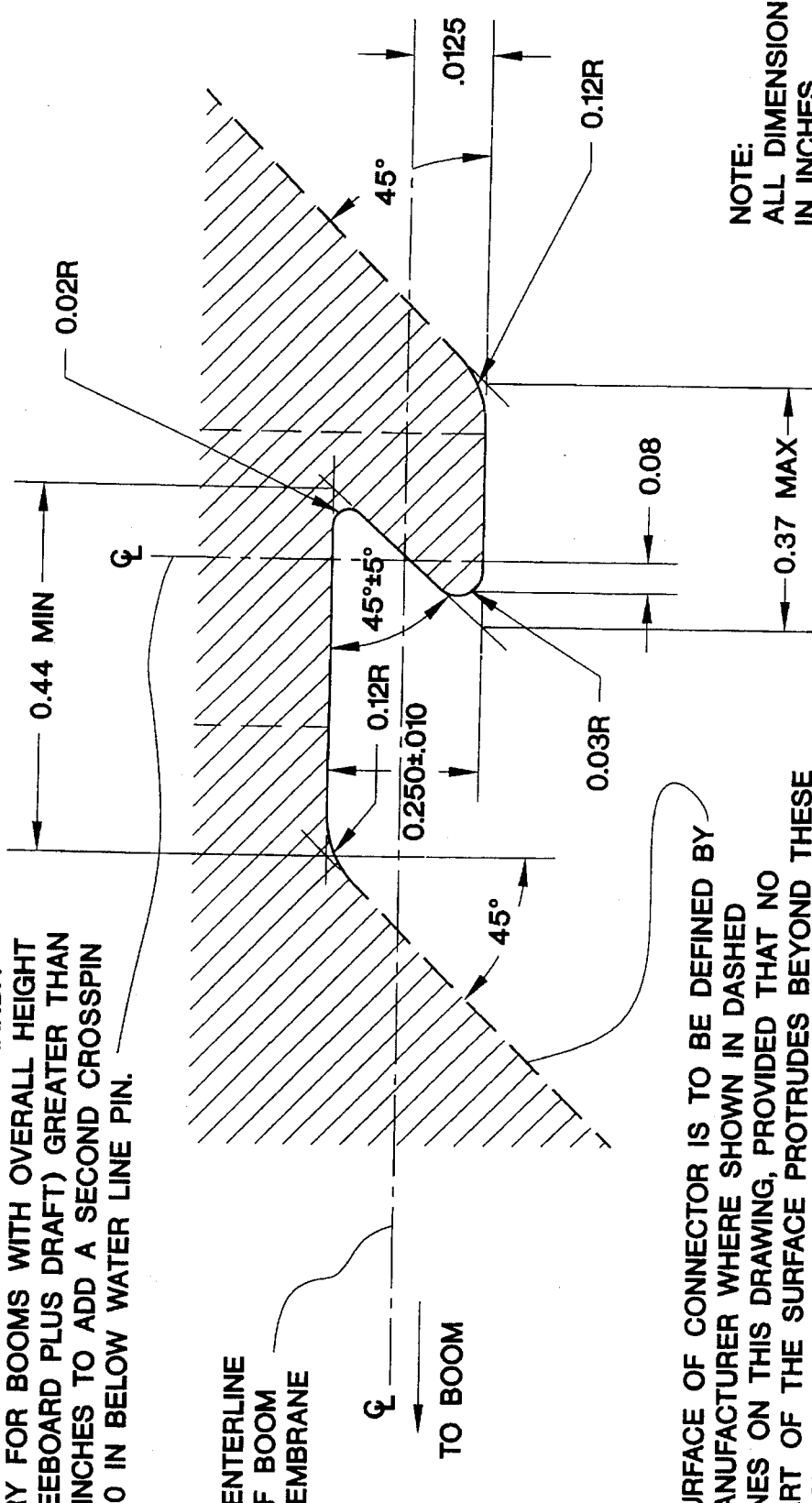

FIG.6
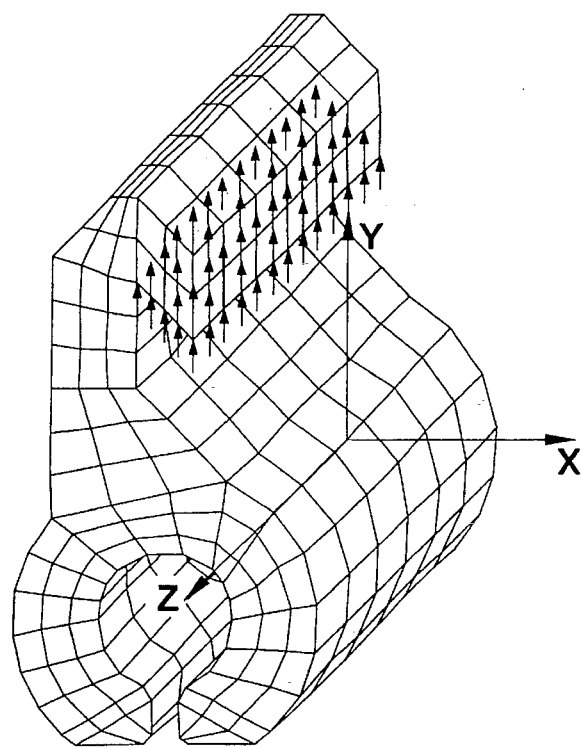
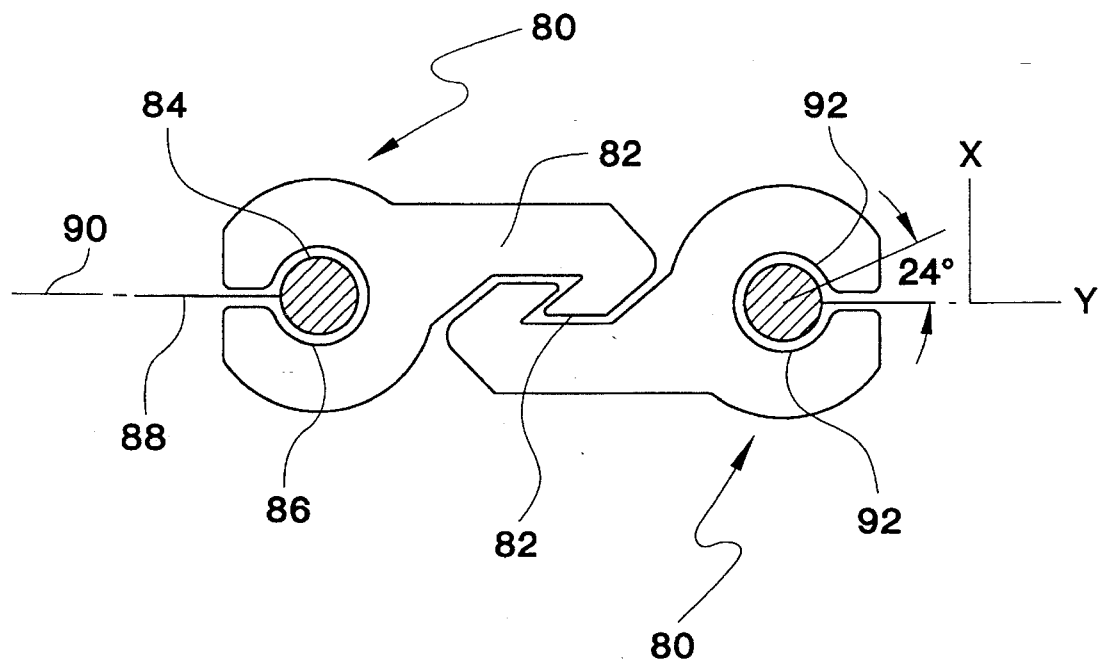
FIG.7(a)

OIL BOOM END CONNECTOR

The present invention relates to an improved oil boom end connector which avoids the need for end flanges, through bolts, rivets, or fasteners.

BACKGROUND OF THE INVENTION

Oil booms are vertical skirts which are placed in water bodies to contain oil or hazardous materials such as gasoline, and prevent these materials from causing environmental damage to areas such as the environmental damage caused by the Exxon VALDEZ in the Prince William Sound. As illustrated in FIG. 1, an oil boom 10 includes a floatation chamber 12, which suspends a vertical boom draft skirt 14, wherein the floatation chamber 12 provides freeboard above the water surface and the boom skirt 14 provides draft below the water surface. A chain or ballast weight 16 is also connected to the lower end of the boom skirt in order to maintain the boom skirt in a vertical position.

As illustrated in FIG. 2, oil booms may be towed in either "J", "U", or "V", configurations or can be anchored in stationary positions (the "O" configuration) around vessels or in a manner to protect an environmentally sensitive shore line. Oil booms typically are produced in lengths of 50 or 100 feet, wherein a given length of boom is connected to an identical length of boom or a towing assembly via a connector. Interconnection between boom sections can be provided with the various jaw configurations by mating two connectors together or mating boom sections to a towing hawser. Typical jaw configurations are defined by the American Society for Testing and Materials (ASTM) and also by industrial configurations.

Oil boom connectors presently utilized in industry come in a variety of shapes. Typically, connectors include two flat plates bolted through a fabric member, wherein a connecting jaw or other connecting interface is utilized to mate two connectors at the junction of the two boom sections. A typical flat plate-bolted assembly is illustrated in FIG. 3(g). As discussed above, however, there are numerous oil boom connectors in various shapes, with various advantages and disadvantages. A good oil boom connector must be secure, strong, and prevent oil leaks. Connector strength is a primary consideration because failure of the oil boom is often at the connector.

In addition to the basic connector requirements of security, strength, and oil leak prevention, a connector should also be easy to manipulate. This is particularly important if boom sections are stored separately. If the connectors are difficult to manipulate, it may be necessary to lay the boom out in joint sections before it is deployed. In many spill situations, there is not enough working space to lay the boom out or if there is space, rough weather may make joining the sections difficult.

Further, sometimes boom skirts of different lengths are required after the boom is in the water. In order to change the boom skirt, boat crewman must lean over the side, draw two ends together, and make the connection. This task may be difficult in strong current, high winds, stormy seas, and low temperatures. Reports from the Prince William Sound during the VALDEZ spill revealed that even universal ASTM connectors are difficult to hook up, especially when the booms are in tension. Further, in cold water, variable rates of expansion of aluminum and stainless steel parts make connectors difficult to open. If the boom skirt must be changed after the oil boom has been deployed, a connector is required which can be quickly joined by a crewman working out of a boat, without the use of tools or requiring manipulation of loose bolts, pins, or cover plates. Complicated attachments involving loose fasteners generally can not be made from a pitching boat in rough water. In addition, loose bolts and tools are likely to be lost over the side of the vessel. Ideally, boom connectors should have the following features:

1) sections can be joined by simply drawing the two ends together;

2) any two ends can be joined, i.e., there are no male and female attachments;

3) connectors can be secured by simply turning a wing nut or inserting a pin and boom sections can be joined in a few minutes by men working from a small boat in rough weather;

4) connectors continue to be operable even when covered with some ice; and 5) connectors can be manipulated in cold weather by crewman wearing heavy gloves.

FIGS. 3(a) to (i) illustrate most types of connectors currently available. The first type illustrated in FIG. 3(a) is a quick connector. These "Z" type fittings are joined and secured with a wing nut or pin.

The second type, illustrated in FIG. 3(b), is a universal slide type 1 connector. This is similar to the quick connector except that the two ends must slide together either from the top or the bottom. The term "universal" is used because there are no male or female connections. FIG. 3(c) illustrates a universal slide type 2 connector. FIG. 3(d) illustrates a slide type connector which has a male and female attachment on opposite ends of the boom.

FIG. 3(e) illustrates a slotted tube connector, wherein a plastic slotted tube slides over a sealed rope at each end of the boom. The slotted tube end connector does not have male or female connections. FIG. 3(f) illustrates a raised channel connector, wherein one end of the boom has a raised channel similar to the slotted tube, while the other end has a raised fabric that is pulled through the tube. As is illustrated in FIG. 3(f), there is a male and female end.

FIG. 3(g) illustrates a bolt connector, wherein bolts are inserted through matching holes in the fabric on both ends of the boom and secured with simple nuts or wing nuts. Further, the front and back of the sections to be joined are reinforced with a metal plate.

As illustrated in FIG. 3(h), a hinged plate and pin end connector has a flat plate on each end of the boom. A male end has a fixed pin at the top and a hole at the bottom and a female end has a slot at the top and a hole at the bottom. The slot is aligned over the fixed pins then the holes in both ends are matched up at the bottom and secured with a separate pin.

Finally, the hinge and pin end connector illustrated in FIG. 3(i) is a simple "piano" hinge with a long pin that is inserted through the joint ends.

Some advantages and disadvantages of the various connectors discussed above is apparent from the above description and FIGS. 3(a) to (i). Other advantages and disadvantages are not readily apparent. Each of the above illustrated end connectors will be discussed in further detail below.

Quick connectors are easy to join as the name implies, generally by one person, and probably from a boat in some kind of adverse weather. No tools are required, locking pins are attached with a lanyard and can not be lost over the side of the boat, and there are no problems with male and female connectors if they are rigged properly. In heavy seas, there could be some problem lining up the two ends to insert the locking pin. The ends of the universal slide connectors are nearly identical, except one end must slide over the other.

The slide connector is similar to the universal slide connector and the quick connector except that there are two types of end connections. This is not a severe disadvantage, except that some planning may be required to assure compatible connectors are available and in place to be joined. The slotted tube connectors could present problems to a deployment crew if the boom is already in the water. If the sealed rope in the end of the boom is swollen, fouled, or the fabric is torn, it may be difficult to pull the rope ends into the slotted tube. Joining a boom with these connectors probably can only be done by two people working on land or on stable platform. The raised channel connectors have the same problems as the slotted tubes. These booms should be connected by two people working ashore. As in the case of the slotted tube, if there is no need to change boom length after it is deployed, a more elaborate and expensive version is probably not required.

Bolt connectors are likely to be firm and strong, but they should be manipulated ashore. Bolts are often used on booms that are permanently installed in harbors. They are very strong, so if there is no need to change the length of the boom after it has been deployed, they are adequate. Hinged plates and pin connectors can probably be installed by someone working over the side of boat in calm seas. The hinge probably can be joined easily, however installing the pin in the bottom of the boom that is already in the water could be a problem in rough weather. The hinge and pin connectors probably need two people for installation either ashore or on a fairly stable boat. These connectors are often used on booms permanently deployed in harbors. The hinges and pins are a strong connection and if the boom length does not require adjustment, the hinge and pin connectors are adequate.

Most of the quick connectors and slide connectors are made of marine aluminum. If the overall height of the boom is no more than about 24 inches, aluminum is satisfactory. However, for larger booms, a height of 36 inches or more, the connector may warp slightly making it almost impossible to join boom sections. As a result, these connectors are generally not used on large booms. Large open water boom sections are joined by bolt connectors or hinge and pin connectors made of stainless steel. This provides a strong secure connection. Boom sections can not be joined when the boom is in the water. Further, open water wind and wave conditions do not permit the joining of boom sections in any case.

In 1986, the American Society for Testing and Materials (ASTM) developed a standard hook neck for boom connectors, illustrated in FIG. 4. This standard was established to ensure booms from various sources would fit together without specifying how the connector must be made. FIG. 4 illustrates the approved ASTM end connector configuration. The standard specification is intended to provide for interconnectable oil spill response booms of various sizes, strengths, and designs and manufacturers. The design criteria calls for a hook engagement design. This is basically similar to the quick connector. The "Z" connector is to be secured with a self locking cross pin attached to each end of the boom by a lanyard long enough to reach a cross pin hole. A second pin is suggested for booms with an overall height of 24 inches. Further design criteria require that the connector shall have adequate mechanical strength, minimize oil leakage, have neither male nor female connections, be the full height of the boom of which it is a part, not impair stability of the boom, require no special tools for assembly, and not reduce freeboard. Other desirable features include speed and ease of connection, light weight, connectable in water, readily cleaned of sand and debris, inherently safe to personnel, and easy to install and replace.

Further, the end connector and cross pin materials shall be corrosion resistant in sea water and should have appropriate weight, mechanical strength, chemical resistance, flexibility, depending on the conditions in which it is to be used.

One improvement on the typical flat plate-bolted assembly illustrated in FIG. 3(g) is identified in U.S. Pat. No. 4,295,756. This end connector includes features of construction and arrangements of parts which provide for an improvement in load transfer between the connector and the fabric material utilized in the boom. This improvement in load transfer is achieved with a combination of elements and design features, all of which incorporate the use of flanges, bolts, rivets, and fasteners. One advantage of the '756 patent is that an extrusion with integral proximal end flanges negates the need to assemble two flat plates and connection is made as described specifically in FIGS. 2 and 3 of the subject patent via bolts, rivets, or other fasteners, (in particular, element 43 of FIG. 2), which securely clamp the connector flanges 35 to the boom fin fabric 38. As described in FIG. 2 of the '756 patent, elements 42, 48, and/or 53 are used to retain the fabric within the hollow cavity of the boom end connector. This connector assembly provides an advantage over the conventional flat plate connectors, wherein the flange connector can be utilized in a manner to increase the ability to transfer loads by other than simple friction between two flat plates.

The invention described in the present application is an improvement over the above-identified conventional boom end connectors. The present invention is directed to a novel, one-piece connector for use in oil spill containment boom systems. The present connector designed includes a special structural shape, which easily connects to the boom fabric and provides high tensile strength. This unique connector design utilizes a special extruded shape, which distributes the tensile loads in the curved walls of the connector in a manner which negates the need for proximal end flanges and in a manner which avoids the need for bolts, rivets, or other fasteners to secure the connector to the boom fin. Since the oil boom end connector of the present application negates the need for proximal end flanges, bolts, rivets, or other fasteners, oil booms utilizing the oil boom end connector of the present application require less assembly time and have a lower assembly cost.

This unique connector design further permits high speed, low cost fabrication, which may include high speed extrusion or injection molding. The size, simplicity, and form of the disclosed end connector are critical elements in reducing final boom assembly time, parts, maintenance, and overall cost.

SUMMARY OF THE INVENTION

One object of the present invention is to create a novel end connector for use with oil containment booms, wherein the connector design utilizes a stress distribution technique which avoids the need for proximal end flanges, internal cavity traction surfaces, and further avoids bolts, rivets, or other fasteners through the boom fin end. This novel end connector design has a smaller size than conventional end connector designs with comparable tensile strength capabilities. Further, the novel end connector of the present application may be fabricated faster than conventional end connectors, reduces connector cost, and reduces final boom assembly time. This object of the present invention is fulfilled by providing an oil boom end connector comprising:

two curved beam arms made of a predetermined material, which define a central cavity wherein a width h of each of said two curved beam arms is defined by:

$$h \geq \frac{.5r}{\left(1.2 - \frac{2\sigma_{ws}r}{P_R}\right)} \left[-12 - 3.1 \frac{\sqrt{9P_R + 10\sigma_{ws}r}}{P_R}\right]$$

provided:

$$\frac{\sigma_{ws}}{P_R} > \frac{0.6}{r}$$

where:
$R_R$=a single arm load;
$\sigma_{WS}$=the predetermined material allowable working stress;
r=a radius of the central cavity; and
h=a thickness of the each of said two curved beam arms.

This and other objects of the present invention will become more readily apparent from the detailed description given hereinafter. However, it should be understood that a detailed description and specific examples, while indicating preferred embodiments of the invention are given by way of illustration only, since various changes and modifications within the spirit and scope of the invention will become apparent to those skill in the art from the detailed description.

BRIEF DESCRIPTION OF THE DRAWINGS

The present invention will become more fully understood from the detailed description given hereinbelow and the accompanying drawings, which are given byway of illustration only and thus are not limitative of the present invention, wherein.

FIG. 4 illustrates the ASTM standard hook neck for boom connectors;

FIG. 6 illustrates the oil boom end connector of the present application in more detail; and FIGS. 7(a)–7(e) illustrate various features of the oil boom end connector of the present application.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENT

The present application is directed to a novel, one-piece connector for use in oil spill containment boom systems. The present connector design includes a special structural shape, which easily connects to the boom fabric while providing high tensile strength. The novel end connector of the present application utilizes a special extruded shape, which distributes the tensile loads in the curved walls of the connector in a manner which negates the need for proximal end flanges and in a manner which avoids the need for bolts, rivets, or other fasteners to secure the connector to the boom fin. Since the oil boom end connector of the present application negates the need for proximal end flanges, bolts, rivets, or other fasteners, oil booms utilizing the oil boom end connector of the present application require less assembly time and have a lower assembly cost.

This unique connector design further permits high speed, low cost fabrication, which may include high speed extrusion or injection molding. The size, simplicity, and form of the present end connector are critical elements in reducing final boom assembly time, the number of parts necessary, maintenance on the boom, and overall cost of the boom.

As discussed above, the types of currently available end connectors can be divided into several categories, such as quick connectors, universal slide, slide tube, raised channel, or bolted connectors. Although there are many different conventional connectors, they all have two things in common, namely their relatively large size and their complicated or inefficient method of joining the boom fabric to the connector. The design of the present end connector results in a significantly smaller end connector which is easy to assemble and which very efficiently transfers a load from connector to connector and from connector to the boom fabric.

Figure 1:
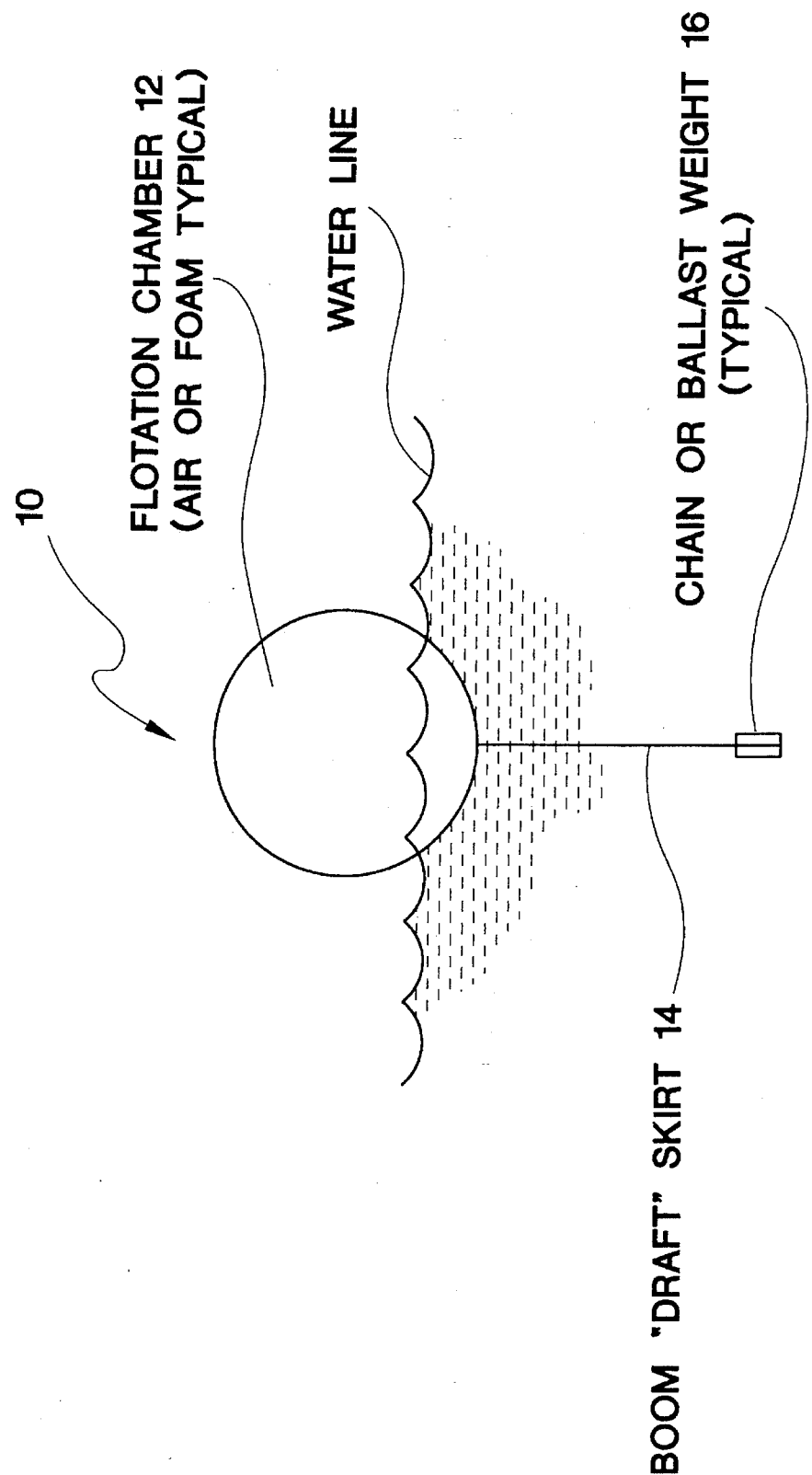
FIG. 1 illustrates an oil boom including a flotation chamber, boom skirt, and ballast weight.
Figure 2:
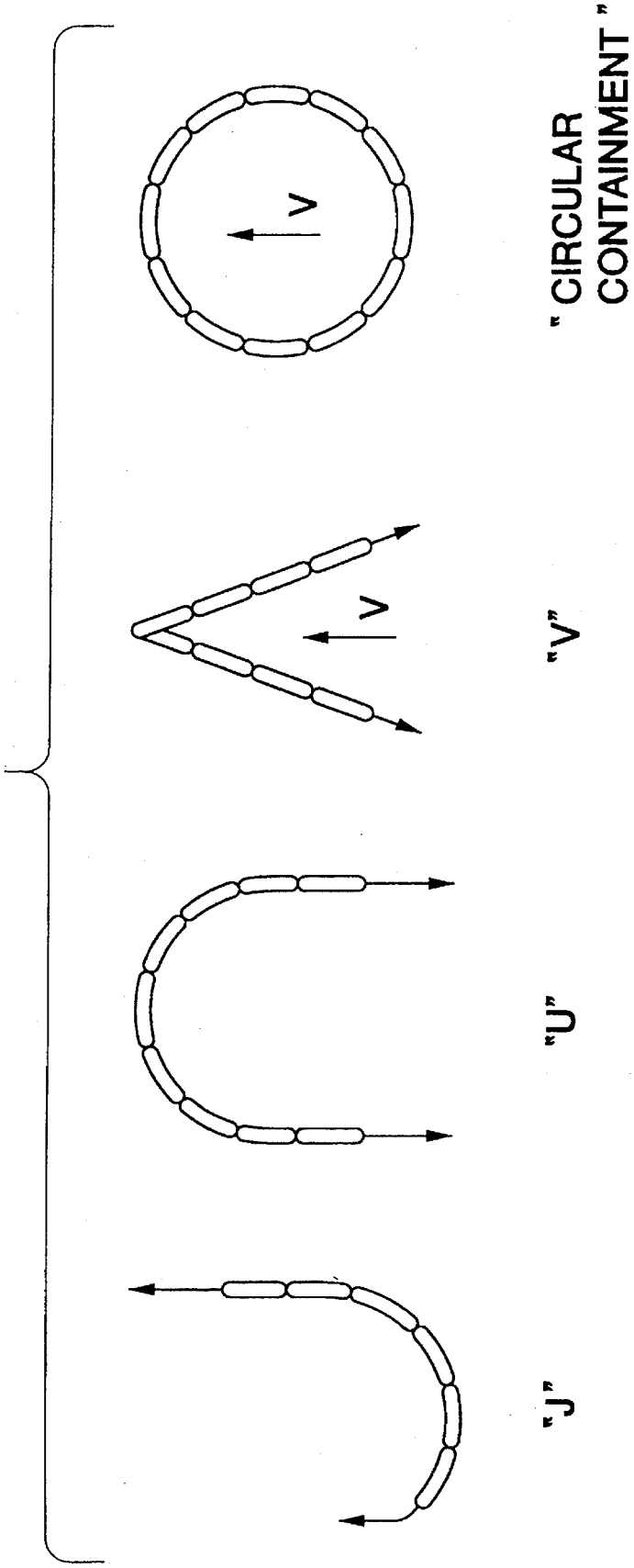
FIG. 2 illustrates various configurations of oil booms.
Figure 3C:
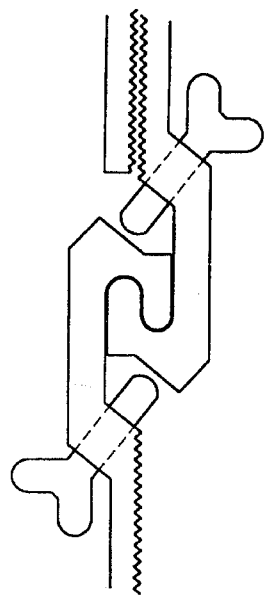
FIGS. 3(a)–3(e) illustrate conventional oil boom connectors.
Figure 3D:
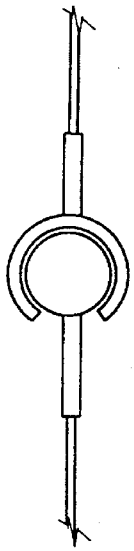
Figure 3A:
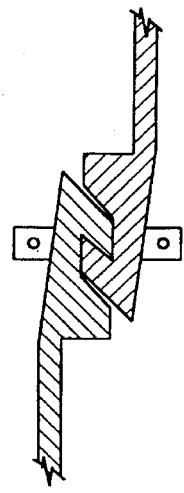
Figure 3B:
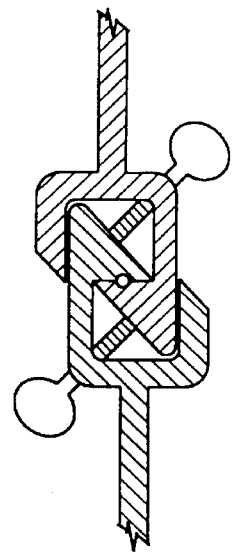
Figure 3I:
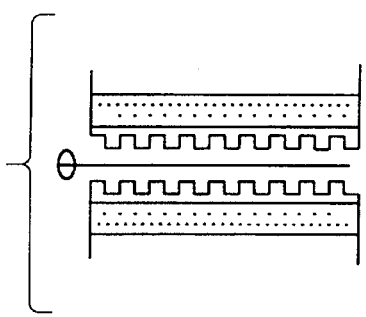
Figure 3G:
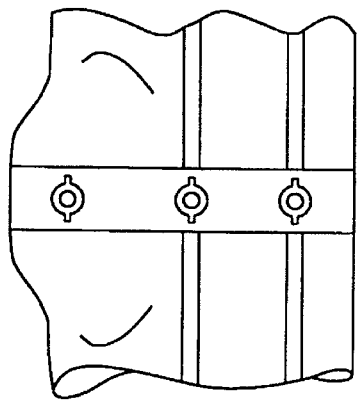
Figure 3H:
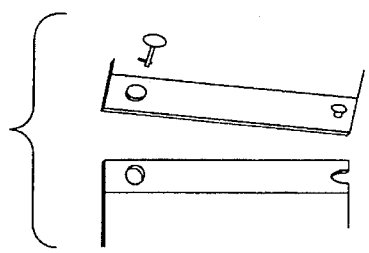
Figure 3E:
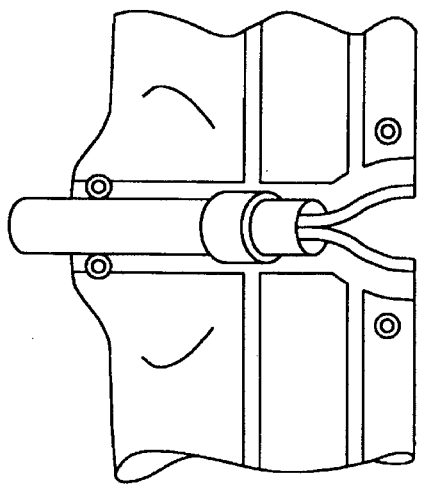
Figure 3F:
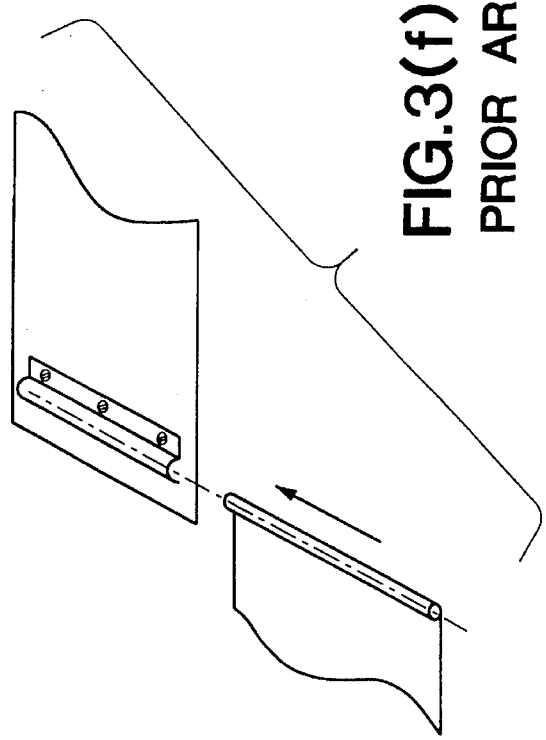
Figure 5:
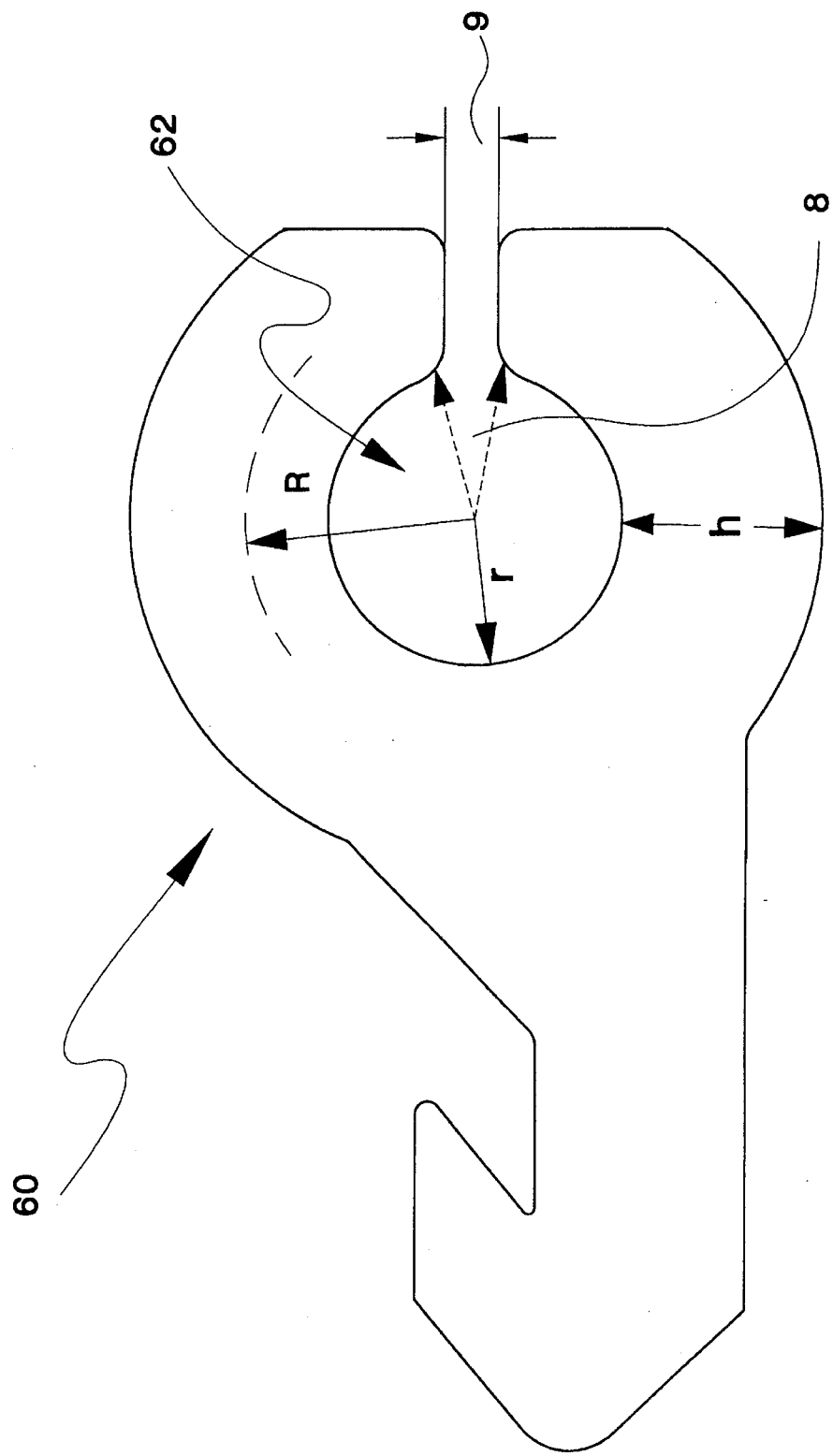
FIG. 5 illustrates a side view of the oil boom end connector of the present application.

FIG. 5 illustrates a side view of the boom connector 60 of the present application, wherein a simple extrusion, which can be fabricated at high speed, is utilized as the entire connector assembly. This connector transfers load very efficiently between the connector and the fabric via a single, cylindrical rod (not shown), which is inserted within a cylindrical cavity 62, whereby the load forces are transferred from the connector to a boom fabric material wrapped around the cylindrical rod without the need for bolted connections. The dimensions of the curved sidewalls provides a load transfer which avoids the need for flanges or bolts, which are required in conventional end connectors, such as the one illustrated in FIGS. 1–3 of the '756 patent. Further, the improved end connector of the present application does not require a corrugated central cavity, two mating tapered core pieces, traction engagement between lobes of the connector, or vertical wedging bars, and as a result, greatly simplifies the assembly of the boom end connector to the boom fabric.

The oil boom end connector of the present application is illustrated in more detail in FIG. 6.

As should be evident from FIGS. 5 and 6, the ASTM interface is interchangeable with the quick connector interface or universal slide type 1 interface or any other conventional interface disclosed herein. One of the novel features of the present application is the fabric-to-connector interface and a portion of the connector which carries the load in a fashion which does not require bolts, flanges, or other fasteners.

Another novel feature of the present oil boom connector is the design of the curved walls such that the connector can be produced via high speed extrusion while maintaining the ability to withstand the forces and loads imposed along the curved sidewalls when in use, while at the same time avoiding the need for bolted flanges to maintain structural integrity.

Various physical dimensions of the novel oil boom end connector of the present application are illustrated in FIG. 5. In FIG. 5:

R=a radius to a neutral axis of the connector curve beam arm in inches. This parameter is dependent on the internal radius and the end connector thickness. Aside from being used in the derivation of the connector thickness, it is not a parameter that is used in the end connector design;

r=a radius to an internal surface of the connector curve beam arm which is equal to a radius of a central cavity in inches. Typical internal radii will vary from ⅛" to ½" (in the example provided below, r=0.3 inches);

g=a cavity gap which accommodates the skirt material and may vary from 0 to 0.837 radians*r without compromising the structural integrity of the connector; and h=the connector curved beam arm thickness in inches.

Additional required values include:

$\sigma_{ws}$=the connector material allowable working stress, in the example provided below $\sigma_{ws}$=34,400 psi (this value is the yield stress of candidate materials divided by an appropriate factor of safety, such as 1.5 for aluminum or steel). The end connector may also be made out of any ductile engineering material, composite, plastic, glass-filled polymers, alloy (such as nickel or steel), stainless steel, titanium, or platinum. The range of yield strengths for typical materials can range from 10,000 psi for low strength plastics to well over 150,000 psi for high strength steels;

Fy'=a load or force on an entire length of the connector/boom skirt in lbs/in, where T=Fy'÷L where L is the connector length;

T=boom skirt tension per length of connector (in the example provided below, T=2040 lbs/in);

Fy=a load or force on one arm of the connector per unit length, where Fy=T/2 lbs/in; and $P_R$=the connector single-arm load in lbs/inch defined as the 24° incident force (in the example provided below) where:

$$P_R = (T/2) \div \cos 24° = Fy \div \cos 24°$$

The connector single-arm load may be defined at any angle between 0° and 24°. However, since the boom skirt must exit the end connector, more realistically the single arm gap angle range is 4° to 24° and for typical end connector with a radius, r of ¼" to ⅜", the single arm gap angle range is typically 8° to 15°.

The novel end connector of the present invention has a connector curved beam arm thickness, h of:

$$h \geq \frac{.5r}{\left(1.2 - \frac{2\sigma_{ws}r}{P_R}\right)} \left[ -12 - 3.1 \sqrt{\frac{9P_R + 10\sigma_{ws}r}{P_R}} \right]$$

with the restriction that:

$$\frac{\sigma_{ws}}{P_R} > \frac{0.6}{r}$$

A detailed description of how h is determined is set forth below.

Two oil boom end connectors 80 are illustrated in FIG. 7(a). Both of the oil boom end connectors 80 include the ASTM standard hook neck 82. A cylindrical rod 84 is inserted in a central cavity 86 of each end connector 80 in order to secure the beam skirt fabric 88, which has a force 90 in the y direction, acting thereon. The end connector 80 also includes connector/rod contact points 92, where the cylindrical rod 84 contacts the connector 80.

Figure 7C:
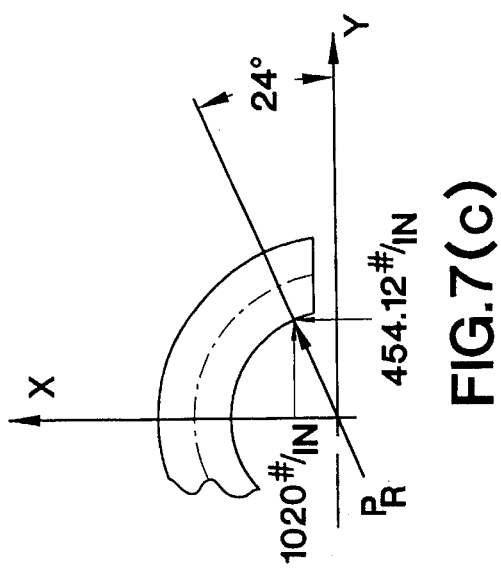
Figure 7E:
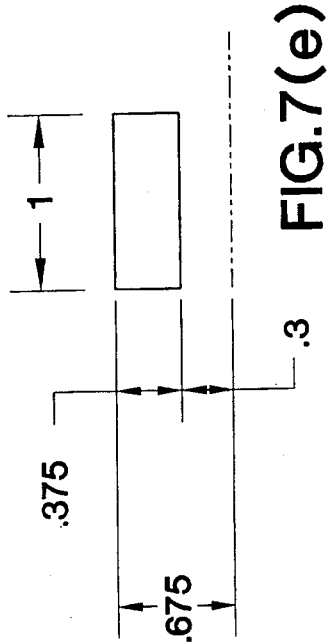
Figure 7B:
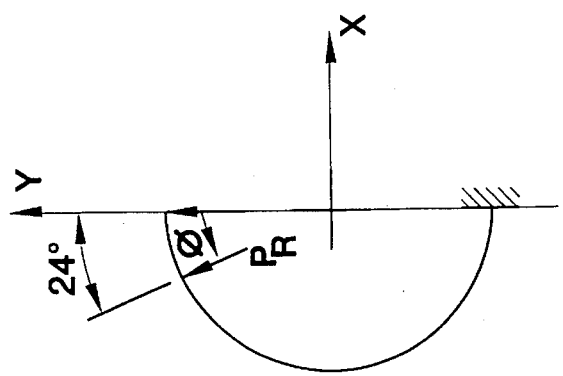

As illustrated in FIG. 7(b), the radial force $P_R$ is defined as the reaction point for the tension exerted by the boom skirt, and equals $$P_R = \frac{T}{2 \cos 24°}$$

The moment in the $\Phi$ direction is as follows:

$$M_\Phi P_R \sin (\Phi - 24°)$$

Further, as illustrated in FIG. 7(c):

$$R_R = 2040/2 \cos 24° = 1116.5 \text{ lbs/in}$$

which includes a force of $F_x$=454.12 lbs in the x direction and a force of Fy=1020 lbs in the y direction.

Figure 7D:
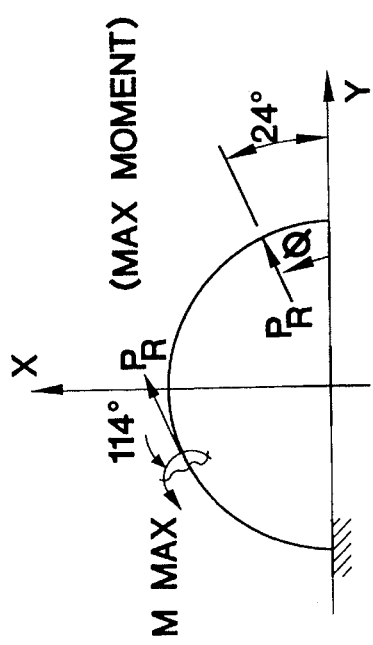

In order to determine the maximum moment M, illustrated in FIG. 7(d):

$$M = P_R R \sin(\Phi - 24°)|_{24°}^{180°}$$

Let $\Theta = \Phi - 24°$
$M = P_R R \sin \Theta$ $$\frac{dM}{d\Theta} = P_R R \cos \Theta$$

If we set dM/dΘ=0, then $$P_R R \quad \cos \Theta = 0$$
$$\cos \Theta = 0$$
$$\cos \Theta = 0, \text{ when } \Theta = \frac{\pi}{2} = 90°$$
$$\Phi = \Theta + 24° = 90 + 24 = 114°$$

Therefore, the maximum moment occurs at 114° from the centerline of the gap (90° from the radial force $P_R$):

$$M_{MAX} = P_R R \sin(114° - 24°) = P_R R \sin 90°$$
$$= P_R R$$
$$= 1116.5 R$$

The cross-section of the connector wall is illustrated in FIG. 7(e). For a straight beam, the maximum stress is as follows:

$$\sigma = \frac{6M}{bh^2}$$

For curved beam, stress is not linear on either side of the neutral axis. As described in M. F. Sports, Design of Machine Elements, 3rd Ed., Prentice-Hall, Englewood Cliff, NJ. (1961), for a curved beam, $$\sigma = K_c \left( \frac{6M}{bh^2} \right)$$

and for a rectangular beam, $$K_c = \frac{3C_1^2 - C_1 - 0.8}{3C_1(C_1 - 1)}$$

and $$C_1 = \frac{2R}{h}$$

In order to find an equation to determine the thickness (h) of the curved beam of the end connector, we first find: total stress $\sigma_{ws}$=stress due to moment $\sigma_m$+stress due to tension $\sigma_T$, where $$\sigma_{ws} = \sigma_M + \sigma_T$$

$$\sigma_M = K_c \frac{6M}{h^2}$$

$$\sigma_t = \frac{P_R}{h}$$

These equations assume a 1 inch length of connector, where $P_R$=lbs/in and M=in·lbs/in.

$$K_c = \frac{3C_1^2 - C_1 - .8}{3C_1(C_1 - 1)}$$

where $C_1 = \frac{2R}{h}$ $$M = P_R \cdot R$$

then:

$$\sigma_M = 6 \left[ \frac{3C_1^2 - C_1 - .8}{3C_1(C_1 - 1)} \right] \frac{P_R R}{h^2}$$

Substituting:

$$C_1 = \frac{2R}{h}$$

$$\sigma_M = \frac{6}{h^2} \left\{ \frac{3\left(\frac{2R}{h}\right)^2 - \frac{2R}{h} - .8}{3\left(\frac{2R}{h}\right)\left(\frac{2R}{h} - 1\right)} \right\} P_R R$$

$$= \frac{6}{h^2} \left\{ \frac{\frac{12R^2}{h^2} - \frac{2R}{h} - .8}{\frac{12R^2}{h^2} - \frac{6R}{h}} \right\} P_R R$$

$$= \frac{6}{h^2} \left\{ \frac{\frac{1}{h^2}[12R^2 - 2Rh - .8h^2]}{\frac{1}{h^2}[12R^2 - 6Rh]} \right\} P_R R$$

$$= \frac{6}{h^2} \left[ \frac{12R^2 - 2Rh - .8h^2}{6(2R^2 - Rh)} \right] P_R R$$

$$= \frac{1}{h^2} \frac{(12R^2 - 2Rh - .8h^2)}{R(2R - h)} P_R R$$

$$\sigma_m = \left( \frac{12R^2 - 2Rh - .8h^2}{2R - h} \right) \frac{P_R}{h^2}$$

Further, $$\sigma_t = \frac{P_R}{h}$$

and $$\sigma_{ws} = \sigma_M + \sigma_T$$

Therefore, $$= \left( \frac{12R^2 - 2Rh - .8h^2}{2R - h} \right) \frac{P_R}{H^2} + \frac{P_R}{h}$$

$$= P_R \left\{ \left[ \frac{12R^2 - 2Rh - .8h^2}{2R - h} \right] \frac{1}{h^2} + \frac{1}{h} \right\}$$

Solving for h $$\frac{\sigma_{ws}}{P_R} = \frac{12R^2 - 2Rh - .8h^2}{h^2(2R - h)} + \frac{1}{h} \cdot \frac{h(2R - h)}{h(2R - h)}$$

$$h^2(2R - h) \frac{\sigma_{ws}}{P_R} = 12R^2 - 2Rh - .8h^2 + 2Rh - h^2$$

$$(2Rh^2 - h^3) \frac{\sigma_{ws}}{P_R} = 12R^2 - 1.8h^2$$

$$\frac{2R\sigma_{ws}h^2}{P_R} - \frac{\sigma_{ws}h^3}{P_R} = 12R^2 - 1.8h^2$$

$$\frac{\sigma_{ws}}{P_R} h^3 + 12R^2 - 1.8h^2 - \frac{2R\sigma_{ws}h^2}{P} = 0$$

$$\frac{\sigma_{ws}}{P_R} h^3 - \left( 1.8 + \frac{2R\sigma_{ws}}{P} \right) h^2 + 12r^2 = 0$$

Since $R=h/2+r$ from FIG. 6:
Substituting:

$$\frac{\sigma_{ws}}{P_R} h^3 + 12 \left( \frac{h}{2} + 4 \right)^2 - 1.8h^2 - \frac{2\sigma_{ws}h^2}{P_R} \left( \frac{h}{2} + r \right) = 0$$

$$\left( \frac{h}{2} + r \right)^2 = \frac{h^2}{4} + hr + r^2$$

$$\frac{\sigma_{ws}}{P_R} h^3 + 3h^2 + 12hr + 12r^2 - 1.8h^2 - \frac{\sigma_{ws}h^3}{P_R} - \frac{2\sigma_{ws}h^2 r}{P_R} = 0$$

$$\left( \frac{\sigma_{ws}}{P_R} - \frac{\sigma_{ws}}{P_R} \right) h^3 + \left( 3 - 1.8 - \frac{2\sigma_{ws}r}{P_R} \right) h^2 + 12rh + 12r^2 = 0$$

$$\left( 1.2 - \frac{2\sigma_{ws}r}{P_R} \right) h^2 + 12rh + 12r^2 = 0$$

In the present example,
r=0.3, $\sigma_{ws}$=34,400, and $P_R$=1116.5. Therefore, $$\left( 1.2 - \frac{2 \times 34,400 \times .3}{1116.5} \right) h^2 + 3.6h + 1.08 = 0$$

$-17.286341h^2 + 3.6h + 1.08 = 0$
$17.286h^2 - 3.6h - 1.08 = 0$

Solving the above quadratic equation, $$h = \frac{-b \pm \sqrt{b^2 - 4ac}}{2a}$$

$$h = \frac{3.6 \pm \sqrt{(3.6)^2 + 4(17.286)(1.08)}}{2(17.286)}$$

$$= \frac{3.6 \pm 9.361}{2(17.286)}$$

$h = .375$ $h = -.167$

Since h cannot be negative, h must be at least 0.375 inches.
Substituting appropriate terms from Equation (a) into Equation (b) gives:

$$h = \frac{.5}{\left(1.2 - \frac{2\sigma_{ws}r}{P_R}\right)} \left[ -12r - \sqrt{(12r)^2 - 4\left(1.2 - \frac{2\sigma_{ws}r}{P_R}\right)(12r^2)} \right]$$

$$= \frac{.5}{\left(1.2 - \frac{2\sigma_{ws}r}{P_R}\right)} \left[ -12r - \sqrt{144r^2 - 57.6r^2 + \frac{96\sigma_{ws}r^3}{P_R}} \right]$$

$$= \frac{.5}{\left(1.2 - \frac{2\sigma_{ws}r}{P_R}\right)} \left[ -12r - \sqrt{86.4r^2 + \frac{96\sigma_{ws}r^3}{P_R}} \right]$$

$$= \frac{.5}{\left(1.2 - \frac{2\sigma_{ws}r}{P_R}\right)} \left[ -12r - 3.1r\sqrt{\frac{9P + 10\sigma_{ws}r}{P_R}} \right]$$

$$h \geq \frac{.5r}{\left(1.2 - \frac{2\sigma_{ws}r}{P_R}\right)} \left[ -12 - 3.1\sqrt{\frac{9P + 10\sigma_{ws}r}{P_R}} \right]$$

In order to verify h=0.375 is correct, $$R = \frac{1}{2}h + r$$

$$R = (.675 + .3)/2 = .4875$$

$$C_1 = \frac{2(.4875)}{.375} = 2.6$$

$$K_C = \frac{3C_1^2 - C_1 - 0.8}{3C_1(C_1 - 1)} = \frac{3(2.6)^2 - 2.6 - 0.8}{3(2.6)(2.6 - 1)} = 1.353$$

The bending stress due to the moment is defined as:

$$\sigma_B = K_C\left(\frac{6M}{bh^2}\right)$$

$$= 1.353\left[\frac{6M}{1(.375)^2}\right]$$

$$\sigma_B = 57.728\,(1116.5\,R)$$

$$= 57.728\,(1116.5)\,(.4875)$$

$$= 31421\text{ psi}$$

The stress due to tension is:

$$\sigma_t = \frac{P_R}{A} = \frac{1116.5}{1(.375)} = 2977 \text{ psi}$$

and the total stress is:

$$\sigma_{ws} = \sigma_M + \sigma_T = 31421 + 2977 = 34398 \text{ psi}$$

which is consistent with the original value for $\sigma_{ws}$ of 34,400 psi.

FIG. 7(e) illustrates the cross-section of the example end connector. The end connector has a length of 1 inch, a radius r of 0.3 inches, a thickness h of 0.375 inches, and a radius to the neutral axis, R of 0.675 inches.

The novel oil boom connector defined by the above-identified application has been verified by finite element analysis to verify the structural integrity of the oil boom connector. The oil boom connector of the present application may be produced by a high-speed extrusion process and the design and the design approach of the oil boom connector of the present application offer the advantages set forth above over other alternatives used by industry for oil boom connectors.

The novel end connector of the present invention has a connector curved beam arm thickness, h of:

$$h \geq = \frac{.5r}{\left(1.2 - \frac{2\sigma_{ws}r}{P_R}\right)} \left[ -12 - 3.1\sqrt{\frac{9P_R + 10\sigma_{ws}r}{P_R}} \right]$$

with the restriction that:

$$\frac{\sigma_{ws}}{P_R} > \frac{0.6}{r}$$

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. An oil boom end connector, comprising:
   two curved beam arms made of a predetermined material, which define a central cavity wherein a width h of each of said two curved beam arms is defined by:

$$h \geq \frac{.5r}{\left(1.2 - \frac{2\sigma_{ws}r}{P_R}\right)} \left[ -12 - 3.1\frac{\sqrt{9P_R + 10\sigma_{ws}r}}{P_R} \right]$$

provided:

$$\frac{\sigma_{ws}}{P_R} > \frac{0.6}{r}$$

where:
   $R_R$=a single arm load;
   $\sigma_{ws}$=the predetermined material allowable working stress;
   r=a radius of the central cavity; and
   h=a thickness of the each of said two curved beam arms.

2. The oil boom end connector of claim 1, wherein the predetermined material is a ductile engineering material.

3. The oil boom end connector of claim 2, wherein the ductile engineering material is a plastic, a glass-filled polymer, a nickel alloy, a steel alloy, a stainless steel, a composite, titanium, aluminum or platinum.

4. The oil boom end connector of claim 1, wherein a shape of said oil boom end connector permits high speed fabrication.

5. The oil boom end connector of claim 4, wherein the high speed fabrication is high speed extrusion.

6. The oil boom end connector of claim 4, wherein the high speed fabrication is high speed injection molding.

7. The oil boom end connector of claim 1, wherein said oil boom end connector provides high tensile strength, efficiently transfers a load between said end connector and a boom skirt, and is easily connected to the boom skirt.

8. The oil boom end connector of claim 1, wherein said oil boom end connector distributes stress such that proximal end flanges, internal cavity traction surfaces, bolts, rivets, or other fasteners are not required.

9. The oil boom end connector of claim 1, wherein the single arm load $P_R$ is at a predetermined angle.

10. The oil boom end connector of claim 1, wherein the radius of the central cavity varies from ⅛" to ½".

11. An oil boom end connector, comprising:
two curved beam arms made of a predetermined material, which define a central cavity wherein a width h of each of said two curved beam arms is defined by:

$$h = \frac{.5r}{\left(1.2 - \frac{2\sigma_{ws}r}{P_R}\right)} \left[ -12 - 3.1 \frac{\sqrt{9P_R + 10\sigma_{ws}r}}{P_R} \right]$$

provided:

$$\frac{\sigma_{ws}}{P_R} > \frac{0.6}{r}$$

where:

$R_R$=a single arm load;

$\sigma_{ws}$=the predetermined material allowable working stress;

r=a radius of the central cavity; and h=a thickness of the each of said two curved beam arms.

12. The oil boom end connector of claim 11, wherein the predetermined material is a ductile engineering material.

13. The oil boom end connector of claim 12, wherein the ductile engineering material is a plastic, a glass-filled polymer, a nickel alloy, a steel alloy, a stainless steel, a composite, titanium, aluminum or platinum.

14. The oil boom end connector of claim 11, wherein a shape of said oil boom end connector permits high speed fabrication.

15. The oil boom end connector of claim 14, wherein the high speed fabrication is high speed extrusion.

16. The oil boom end connector of claim 14, wherein the high speed fabrication is high speed injection molding.

17. The oil boom end connector of claim 11, wherein said oil boom end connector provides high tensile strength, efficiently transfers a load between said end connector and a boom skirt, and is easily connected to the boom skirt.

18. The oil boom end connector of claim 11, wherein said oil boom end connector distributes stress such that proximal end flanges, internal cavity traction surfaces, bolts, rivets, or other fasteners are not required.

19. The oil boom end connector of claim 11, wherein the single arm load $P_R$ is at a predetermined angle.

20. The oil boom end connector of claim 11, wherein the radius of the central cavity varies from ⅛" to ½".

* * * * *